United States Patent
Lee et al.

(10) Patent No.: US 10,034,311 B2
(45) Date of Patent: Jul. 24, 2018

(54) METHOD AND APPARATUS FOR TRANSCEIVING D2D SIGNAL OF PRACH RESOURCE

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/511,576

(22) PCT Filed: Sep. 22, 2015

(86) PCT No.: PCT/KR2015/009938
§ 371 (c)(1),
(2) Date: Mar. 15, 2017

(87) PCT Pub. No.: WO2016/048003
PCT Pub. Date: Mar. 31, 2016

(65) Prior Publication Data
US 2017/0295597 A1    Oct. 12, 2017

Related U.S. Application Data

(60) Provisional application No. 62/053,754, filed on Sep. 22, 2014.

(51) Int. Cl.
*H04W 4/00* (2018.01)
*H04W 74/08* (2009.01)
(Continued)

(52) U.S. Cl.
CPC ....... *H04W 74/0833* (2013.01); *H04W 72/04* (2013.01); *H04W 92/18* (2013.01)

(58) Field of Classification Search
None
See application file for complete search history.

(56) References Cited

U.S. PATENT DOCUMENTS

2013/0155962 A1* 6/2013 Hakola ............... H04W 76/023 370/329
2013/0157670 A1* 6/2013 Koskela ............ H04W 76/023 455/450

(Continued)

FOREIGN PATENT DOCUMENTS

WO    2014075299    5/2014

OTHER PUBLICATIONS

PCT International Application No. PCT/KR2015/009938, Written Opinion of the International Searching Authority dated Jan. 13, 2016, 22 pages.

(Continued)

*Primary Examiner* — Otis L Thompson, Jr.
(74) *Attorney, Agent, or Firm* — Lee Hong Degerman Kang & Waimey

(57) ABSTRACT

Disclosed is a method for utilizing physical random access channel (PRACH) more efficiently. The method for transmitting a D2D signal according to one embodiment allows a corresponding terminal to transceive a D2D signal, for a PRACH transmission, by means of a non-configured wireless resource from among the PRACH resources.

12 Claims, 11 Drawing Sheets

(51) Int. Cl.
*H04W 72/04* (2009.01)
*H04W 92/18* (2009.01)

(56) References Cited

U.S. PATENT DOCUMENTS

| | | | | |
|---|---|---|---|---|
| 2013/0230032 | A1* | 9/2013 | Lu | H04W 76/023 370/336 |
| 2013/0322413 | A1* | 12/2013 | Pelletier | H04W 72/1289 370/336 |
| 2014/0204847 | A1* | 7/2014 | Belleschi | H04W 76/023 370/329 |
| 2014/0206322 | A1* | 7/2014 | Dimou | H04W 4/005 455/414.1 |
| 2014/0328329 | A1* | 11/2014 | Novlan | H04W 72/042 370/336 |
| 2015/0208440 | A1* | 7/2015 | Agiwal | H04W 74/085 370/329 |
| 2015/0257184 | A1* | 9/2015 | Yamazaki | H04W 76/023 370/329 |
| 2017/0150340 | A1* | 5/2017 | Park | H04W 8/005 |

OTHER PUBLICATIONS

Qualcomm Incorporated, "Coexistence of D2D discovery and WAN", 3GPP TSG RAN WG1 Meeting #76bis, R1-141456, Apr. 2014, 6 pages.

LG Electronics, "Issues on multiplexing of WAN and D2D", 3GPP TSG RAN WG1 Meeting #76bis, R1-141354, Apr. 2014, 10 pages.

Catt, "Channel scrambling and DMRS design for D2D communication", 3GPP TSG RAN WG1 Meeting #76, R1-140101, Feb. 2014, 2 pages.

Samsung, "WAN and D2D priority handling for type-1 discovery", 3GPP TSG RAN WG1 Meeting #78, R1-143082, Aug. 2014, 3 pages.

* cited by examiner

METHOD AND APPARATUS FOR TRANSCEIVING D2D SIGNAL OF PRACH RESOURCE

CROSS-REFERENCE TO RELATED APPLICATIONS

This application is the National Stage filing under 35 U.S.C. 371 of International Application No. PCT/KR2015/009938, filed on Sep. 22, 2015, which claims the benefit of U.S. Provisional Application No. 62/053,754, filed on Sep. 22, 2014, the contents of which are all hereby incorporated by reference herein in its entirety.

TECHNICAL FIELD

The present invention relates to a wireless communication system, and more particularly, to a method and apparatus for transmitting a Device-to-Device (D2D) signal on a PRACH resource in a wireless communication system supporting D2D communication.

BACKGROUND ART

Recently, with the spread of smartphones and tablet PCs and activation of high-capacity multimedia communication, mobile traffic has significantly increased. Mobile traffic is expected to double every year. Since most mobile traffic is transmitted through a base station (BS), communication service operators are being confronted with serious network load. To process increasing traffic, communication operators have installed networks and accelerated commercialization of next-generation mobile communication standards, such as mobile WiMAX or long term evolution (LTE), capable of efficiently processing large amounts of traffic. However, another solution is required to cope with greater amounts of traffic in the future.

D2D communication refers to decentralized communication technology for directly transmitting traffic between contiguous nodes without using infrastructure such as a BS. In a D2D communication environment, each node of a portable device, etc. searches for physically adjacent devices, configures a communication session, and transmits traffic. Since such D2D communication is being spotlighted as the technological basis of next-generation mobile communication after 4G due to ability thereof to cope with traffic overload by distributing traffic converging upon the BS. For this reason, a standardization institute such as 3rd generation partnership (3GPP) or institute of electrical and electronics engineers (IEEE) is establishing D2D communication standards based on LTE-advanced (LTE-A) or Wi-Fi and Qualcomm etc. have developed independent D2D communication technology.

D2D communication is expected not only to contribute to increased performance of a mobile communication system but also to create a new communication service. Further, an adjacency based social network service or a network game service can be supported. A connectivity problem of a device in a shadow area can be overcome using a D2D link as a relay. Thus, D2D technology is expected to provide new services in various fields.

DISCLOSURE

Technical Problem

In D2D communication, resources for transmission of a general Wide Area Network (WAN) signal may overlap resources for transmission and reception of a D2D signal. In general, transmission and reception of D2D signals are performed using uplink resources. In this case, from the position of a user equipment (UE) transmitting the WAN signal (or a BS receiving the WAN signal), transmission of a D2D signal from another UE may be recognized as interference. Therefore, proper coordination between these signals is required.

In D2D communication, synchronization between D2D terminals is maintained/acquired by, for example, a synchronization signal received from the BS, or is maintained/acquired by a D2D synchronization signal (D2DSS) received from a UE synchronization source selected by a predefined rule or signaling (from the BS). Acquisition/retention of synchronization directly affects communication performance, since it is difficult to receive another D2D signal if synchronization is not maintained/acquired in D2D communication. Therefore, omission of such a D2D signal may result in degradation of D2D communication performance.

Thus, there is a need for an efficient way to avoid collision with WAN signals while maintaining D2D communication performance.

TECHNICAL SOLUTION

The object of the present invention can be achieved by providing a method for transmitting a Device-to-Device (D2D) signal by a terminal in D2D communication, the method including receiving, from a base station, Physical Random Access Channel (PRACH) resource information indicating a PRACH resource available for transmission of a PRACH, receiving, from the base station, D2D resource information indicating a D2D resource available for transmission and reception of a D2D signal, transmitting a PRACH on a first radio resource indicated as the PRACH resource and the D2D resource when the terminal is configured to transmit the PRACH on the first radio resource, and transmitting a D2D signal on the first radio resource when the terminal is not configured to transmit the PRACH on the first radio resource.

In another aspect of the present invention, provided herein is a method for receiving a Device-to-Device (D2D) signal by a terminal in D2D communication, the method including receiving, from a base station, Physical Random Access Channel (PRACH) resource information indicating a PRACH resource available for transmission of a PRACH, receiving, from the base station, D2D resource information indicating a D2D resource available for transmission and reception of a D2D signal, transmitting a PRACH on a first radio resource indicated as the PRACH resource and the D2D resource when the terminal is configured to transmit the PRACH on the first radio resource, and receiving a D2D signal from another terminal on the first radio resource when the terminal is not configured to transmit the PRACH on the first radio resource.

In another aspect of the present invention, provided herein is a terminal for transmitting a Device-to-Device (D2D) signal in D2D communication, including a radio frequency unit configured to transmit and receive signals, and a processor configured to control the radio frequency unit, wherein the processor is configured to receive, from a base station, Physical Random Access Channel (PRACH) resource information indicating a PRACH resource available for transmission of a PRACH, receive, from the base station, D2D resource information indicating a D2D resource available for transmission and reception of a D2D signal, transmit a PRACH on a first radio resource indicated as the PRACH resource and the D2D resource when the terminal is configured to transmit the PRACH on the first radio resource, and transmit a D2D signal on the first radio resource when the terminal is not configured to transmit the PRACH on the first radio resource.

In another aspect of the present invention, provided herein is a terminal for receiving a Device-to-Device (D2D) signal in D2D communication, including a radio frequency unit configured to transmit and receive signals, and a processor configured to control the radio frequency unit, wherein the processor is configured to receive, from a base station, Physical Random Access Channel (PRACH) resource information indicating a PRACH resource available for transmission of a PRACH, receive, from the base station, D2D resource information indicating a D2D resource available for transmission and reception of a D2D signal, transmit a PRACH on a first radio resource indicated as the PRACH resource and the D2D resource when the terminal is configured to transmit the PRACH on the first radio resource, and receive a D2D signal from another terminal on the first radio resource when the terminal is not configured to transmit the PRACH on the first radio resource.

Advantageous Effects

According to embodiments of the present invention, collision between PRACH transmission and transmission/reception of the D2D signal may be prevented, and radio resources may be efficiently managed.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

MODE FOR INVENTION

Figure 1:
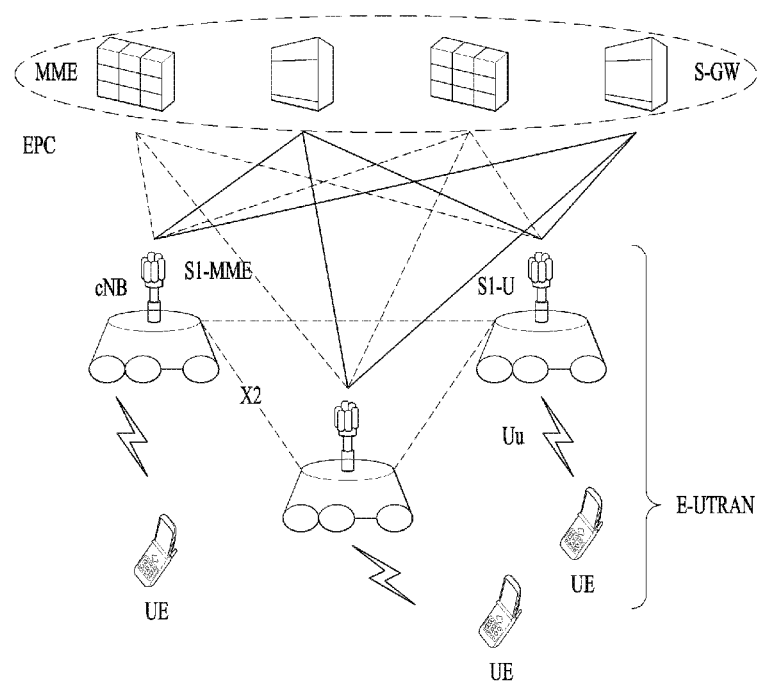
FIG. 1 shows a system architecture of an LTE system which is an example of a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station BS and a user equipment UE. In this case, the base station BS means a terminal node of a network, which performs direct communication with the user equipment UE. A specific operation which has been described as being performed by the base station may be performed by an upper node of the base station BS as the case may be.

In other words, it will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

LTE System Architecture

The architecture of an LTE system, which is an example of a wireless communication system to which the present invention is applicable, will be described with reference to FIG. 1. The LTE system is a mobile communication system that has evolved from a UMTS system. As shown in FIG. 1, the LTE system architecture may be broadly divided into an Evolved UMTS Terrestrial Radio Access Network (E-UTRAN) and an Evolved Packet Core (EPC). The E-UTRAN includes a user equipment (UE) and an Evolved NodeB (eNB). An interface between a UE and an eNB is referred to as a Uu interface, and an interface between eNBs is referred to as an X2 interface. The EPC includes a mobility management entity (MME) functioning as the control plane and a serving gateway (S-GW) functioning as the user plane. An interface between an eNB and an MME is referred to as an S1-MME interface, and an interface between an eNB and an S-GW is referred to as an S1-U interface, and the two interfaces may also be called an S1 interface.

Figure 2:
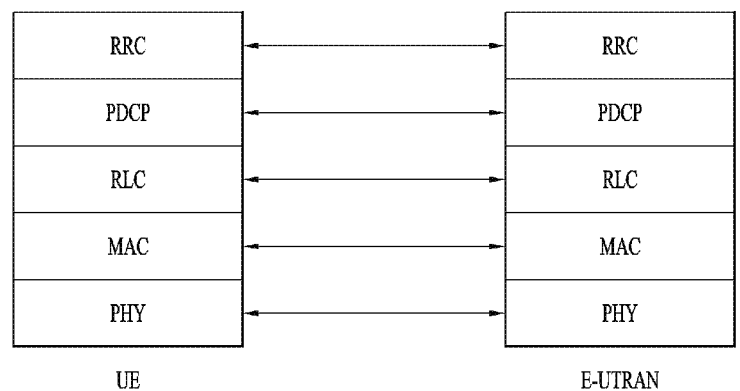
FIG. 2 illustrates a control plane of a radio protocol.
Figure 3:
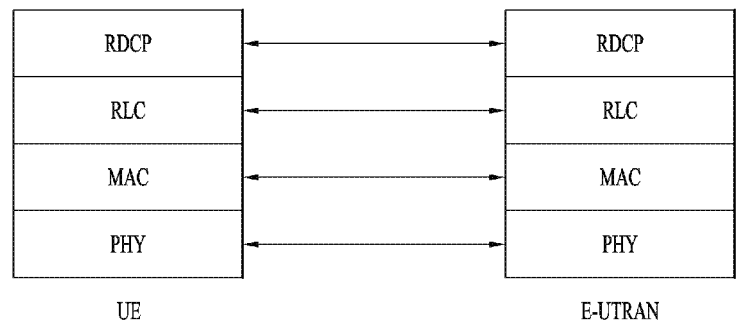
FIG. 3 illustrates a user plane of a radio protocol.

A radio interface protocol is defined in the Uu interface which is a radio section, wherein the radio interface protocol is horizontally comprised of a physical layer, a data link layer and a network layer, and vertically divided into a user plane for user data transmission and a control plane for signaling (control signal) transfer. Such a radio interface protocol may be typically classified into L1 (first layer) including a PHY which is a physical layer, L2 (second layer) including Medium Access Control (MAC)/Radio Link Control (RLC)/Packet Data Convergence Protocol (PDCP) layers, and L3 (third layer) including a Radio Resource Control (RRC) layer as illustrated in FIGS. 2 and 3, based on the three lower layers of an Open System Interconnection (OSI) reference model widely known in the field of communication systems. Those layers exist as a pair in the UE and E-UTRAN, and are responsible for data transmission of the Uu interface.

Hereinafter, each layer of a radio protocol shown in FIGS. 2 and 3 is described. FIG. 2 illustrates a control plane of a radio protocol, and FIG. 3 illustrates a user plane of a radio protocol.

The physical (PHY) layer serving as the first layer (L1) provides an information transfer service for a higher layer using a physical channel. The PHY layer is connected to the Medium Access Control (MAC) layer serving as a higher layer over a transport channel. Through the transport channel, data is transferred from the MAC layer to the physical layer and vice versa. In this case, the transport channel is broadly divided into a dedicated transport channel and a common transport channel depending on whether or not the channel is shared. In addition, data is transferred between different PHY layers, i.e., between a PHY layer of a transmitter and a PHY layer of a receiver over a physical channel using radio resources.

There are various layers in the second layer. The MAC layer serves to map various logical channels to various transport channels and to perform logical channel multiplexing of mapping a plurality of logical channels to one transport channel. The MAC layer is connected to the Radio Link Control (RLC) layer, which is a higher layer, through a logical channel. The logical channel is broadly divided into a control channel for transmitting information on the control plane and a traffic channel for transmitting information on the user plane according to the type of information to be transmitted.

The RLC layer of the L2 segments and concatenates data received from a higher layer to adjust the data size such that the data is suitable for a lower layer to transmit the data in a radio section. To ensure various QoS levels required by various radio bearers (RBs), the RLC layer provides three RLC modes, namely, Transparent Mode (TM), Unacknowledged Mode (UM), and Acknowledged Mode (AM). Particularly, the AM RLC performs a retransmission function using an Automatic Repeat and Request (ARQ) function so as to implement reliable data transmission.

In order to efficiently transmit IP packets such as IPv4 or IPv6 packets in a radio section having a narrow bandwidth, the packet data convergence protocol (PDCP) layer of the L2 performs header compression to reduce the size of an IP packet header containing relatively large and unnecessary control information. This makes it possible to transmit only necessary information in the header portion of the data, thereby increasing the transmission efficiency of the radio section. In the LTE system, the PDCP layer also performs a security function, which consists of a ciphering function to prevent a third party from intercepting data and an integrity protection function to prevent a third party from manipulating data.

The Radio Resource Control (RRC) layer located at the top of the third layer (L3) is defined only in the control plane and is responsible for control of logical, transport, and physical channels in association with configuration, reconfiguration and release of Radio Bearers (RBs). Here, the RB refers to a logical path that the L1 and L2 of the radio protocol provide for data communication between the UE and the UTRAN. Generally, configuring an RB means that a radio protocol layer and channel characteristics needed to provide a specific service are defined and detailed parameters and operation methods thereof are configured. The RB is divided into a Signaling RB (SRB) and a Data RB (DRB). The SRB is used as a transmission passage of RRC messages in the control plane, and the DRB is used as a transmission passage of user data in the user plane.

LTE/LTE-A Resource Structure/Channel

Hereinafter, a DL radio frame structure will be described with reference to FIGS. 4 and 5.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

Figure 4:
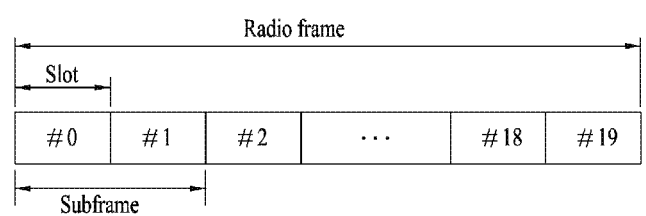
FIG. 4 illustrates the structure of a type-1 radio frame.

FIG. 4 illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

Figure 5:
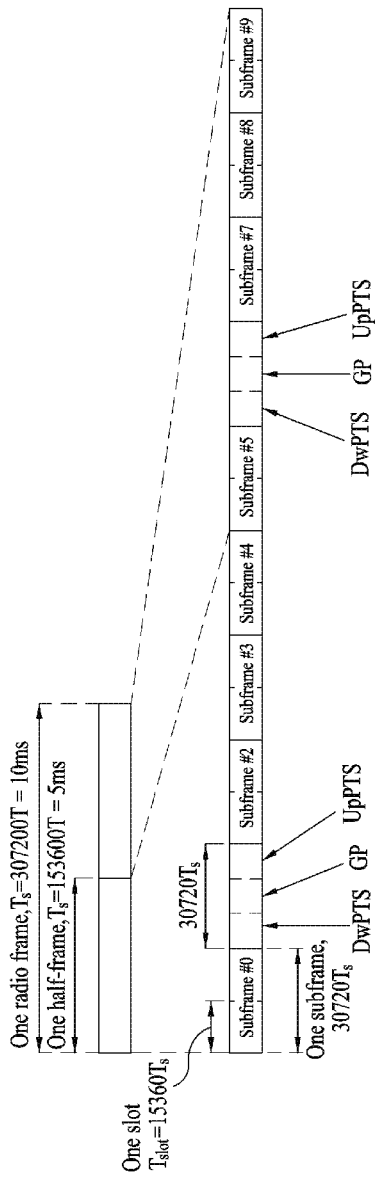
FIG. 5 illustrates the structure of a type-2 radio frame.

FIG. 5 illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The above-described radio frame structures are purely exemplary and thus it is to be noted that the number of subframes in a radio frame, the number of slots in a subframe, or the number of symbols in a slot may vary.

Figure 6:
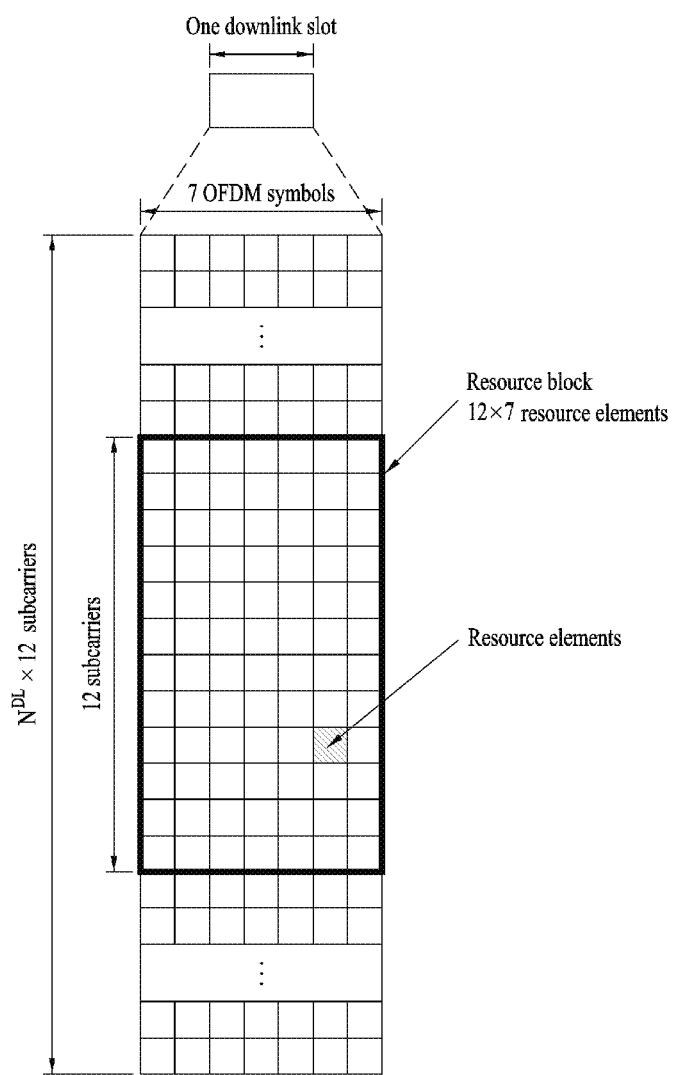
FIG. 6 illustrates a resource grid in a downlink slot.

FIG. 6 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, $N_{DL}$ depends on a downlink transmission bandwidth. An uplink slot may have the same structure as a downlink slot.

Figure 7:
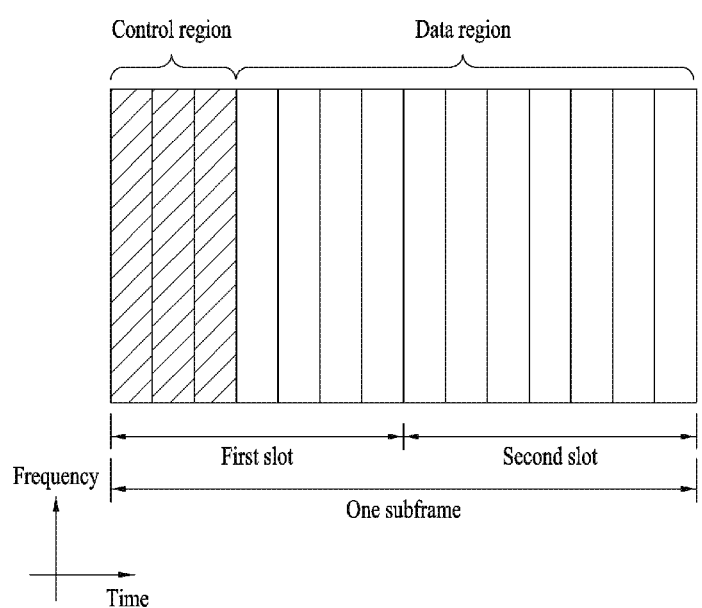
FIG. 7 illustrates a downlink subframe structure.

FIG. 7 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 8:
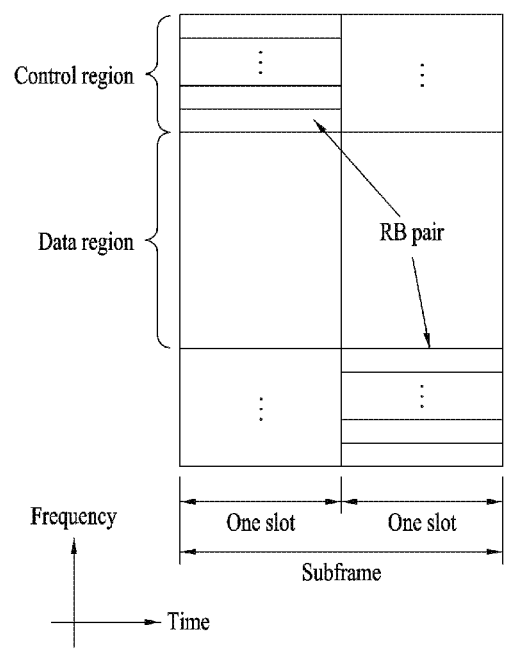
FIG. 8 illustrates an uplink subframe structure.

FIG. 8 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary. For example, in a D2D communication system, UEs may exchange data with each other using an uplink data resource or a corresponding data resource.

Random Access Procedure

In the LTE system, a UE can perform a random access procedure in the following events.

The UE performs initial access since there is no RRC connection to an eNB.

The UE accesses a target cell for the first time in a handover procedure.

The random access procedure is requested by a command of the eNB.

Data for uplink is generated when uplink time synchronization is not established or a predetermined radio resource used to request a radio resource is not allocated.

A recovery procedure is performed due to radio link failure (RLF) or handover failure.

LTE system provides a non-contention random access procedure in a manner that an eNB allocates a dedicated random access preamble to a specific UE and the UE performs a random access procedure using the random access preamble. In other words, in the operation of selecting a random access preamble, there are a contention-based random access procedure using a random access preamble randomly selected in a specific set by a UE and a non-contention-based random access procedure using a random access preamble allocated only to a specific UE by the eNB. The aforementioned two random access procedures differ in whether or not a collision problem is raised. The non-contention-based random access procedure may be used only in the aforementioned handover procedure or when the non-contention-based random access procedure is requested by a command of the eNB.

Figure 9:
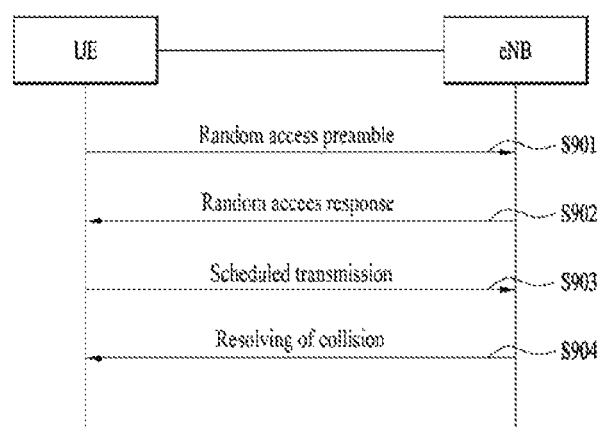
FIG. 9 illustrates operations of a UE and an eNB in a contention-based random access procedure.

FIG. 9 illustrates operations of a UE and an eNB in a contention-based random access procedure.

(1) Transmission of First Message (Msg1)

A UE may randomly select a random access preamble from a set of random access preambles indicated through system information or a Handover Command, select a Physical RACH (PRACH) resource capable of carrying the random access preamble, and transmit the random access preamble on the PRACH resource (S901).

(2) Reception of Second Message (Msg2)

After transmitting the random access preamble as in step S901, the UE attempts to receive a random access response thereof within a random access response reception window indicated through the system information or Handover Command by an eNB (S702). More specifically, the random access response information may be transmitted in the format of a MAC (Media Access Control) PDU (Protocol Data Unit) and the MAC PDU may be transmitted on a PDSCH. To properly receive the information transmitted on the PDSCH, the UE preferably monitors a physical downlink control channel (PDCCH). That is, the PDCCH preferably carries information about a UE to receive the PDSCH, frequency and time information about radio resources of the PDSCH, and information about the transmission format of the PDSCH. Once the UE succeeds in receiving a PDCCH transmitted thereto, the UE may properly receive the random access response on the PDSCH based on the information of the PDCCH. The random access response may include a random access preamble identifier (RAPID), a UL Grant indicating UL radio resources, a Temporary (Cell-Radio Network Temporary Identifier) C-RNTI, and a Timing Advance Command (TAC).

As described above, the RAPID is needed in the random access response to indicate a UE for which the UL Grant, the Temporary C-RNTI, and the TAC are valid since one random access response may include random access response information for one or more UEs. It is assumed in this step that the UE selects a RAPID consistent with the random access preamble that has been selected in step S902.

(3) Transmission of Third Message (Msg3)

If the UE receives a valid random access response, the UE processes the information included in the random access response. That is, the UE applies the TAC and stores the Temporary C-RNTI. In addition, the UE may store data to be transmitted in a message-3 buffer, in response to the received valid random access response.

The UE transmits the data (i.e., a third message) to the eNB based on the received UL Grant (S903). The third message should include an ID of the UE. This is because the eNB cannot determine which UEs perform the random access procedure in the contention-based random access procedure and the UEs need to be identified for contention resolution.

There are two methods to include a UE ID in the third message. As a first method, if the UE has a valid C-RNTI already allocated by a corresponding cell before the random access procedure, the UE transmits the C-RNTI on a UL transmission signal corresponding to the UL Grant. On the other hand, if a valid C-RNTI has not been allocated to the UE before the random access procedure, the UE transmits its unique ID (e.g., an SAE Temporary Mobile Subscriber Identity (S-TMSI) or a Random ID) in the third message. In general, a UE ID is longer than a C-RNTI. Once the UE has transmitted data corresponding to the UL Grant, the UE starts a contention resolution timer (hereinafter referred to as "CR timer").

(4) Reception of Fourth Message (Msg4)

After transmitting the data including its ID according to the UL Grant included in the random access response, the UE awaits instruction from the eNB, for contention resolution. That is, the UE attempts to receive a PDCCH in order to receive a specific message (S904). There are two methods to receive the PDCCH. As described above, if the third message transmitted according to the UL Grant includes a C-RNTI, the UE attempts to receive a PDCCH using the C-RNTI thereof. If the third message includes the UE ID, the UE may attempt to receive a PDCCH using the Temporary C-RNTI included in the random access response. In the former case, if the UE receives the PDCCH using the C-RNTI thereof before the CR timer expires, the UE determines that the random access procedure has been normally performed and terminates the random access procedure. In the latter case, if the UE receives a PDCCH using the Temporary C-RNTI before the CR timer expires, the UE checks data received on a PDSCH indicated by the PDCCH. If the data includes the ID of the UE, the UE determines that the random access procedure has been normally performed and terminates the random access procedure.

Figure 10:
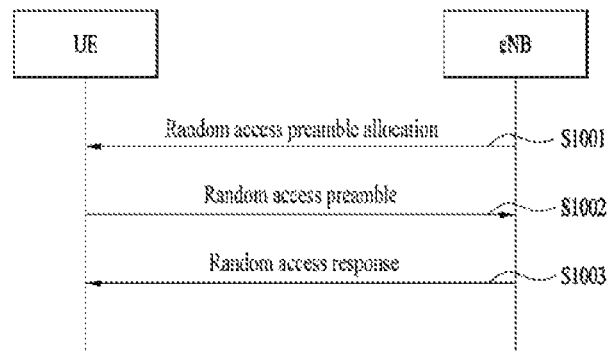
FIG. 10 illustrates operations of a UE and an eNB in a non-contention-based random access procedure.

FIG. 10 illustrates operations of a UE and an eNB in a non-contention-based random access procedure.

In the case of non-contention-based random access, the random access procedure is terminated simply by transmitting the first and second messages, unlike the case of the contention-based random access procedure illustrated in FIG. 9. Note that before the UE transmits a random access preamble as the first message to the eNB, the eNB allocates the random access preamble to the UE. The UE transmits the allocated random access preamble as the first message to the eNB and receives a random access response from the eNB. Thereby, the random access procedure is terminated.

The non-contention-based random access procedure may be performed in the case of a handover procedure or when it is requested by a command of the eNB. Of course, the contention-based random access procedure may be performed in both cases.

(1) Allocation of Random Access Preamble

For the non-contention-based random access procedure, a dedicated random access preamble having no possibility of collision is allocated from an eNB (S1001). The random access preamble may be indicated by the eNB through a handover command or a PDCCH command.

(2) The UE transmits the allocated dedicated random access preamble as a first message to the eNB (S1002).

(3) The method of receiving random access response information (S1003) is the same as used in the contention-based random access procedure.

Physical Random Access Channel (PRACH)

Figure 11:
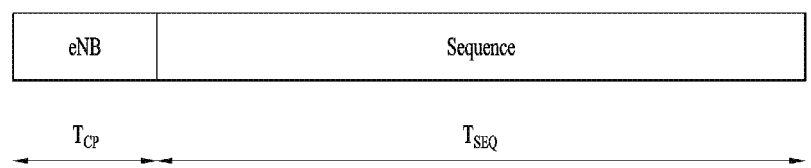
FIG. 11 is a configuration diagram of a random access preamble.

FIG. 11 is a configuration diagram of a random access preamble.

$$n_{PRB}^{RA} = \begin{cases} n_{PRBoffset}^{RA} + 6\left\lfloor \frac{f_{RA}}{2} \right\rfloor, & \text{if } f_{RA} \bmod 2 = 0 \\ N_{RB}^{UL} - 6 - n_{PRBoffset}^{RA} - 6\left\lfloor \frac{f_{RA}}{2} \right\rfloor, & \text{otherwise} \end{cases} \quad \text{Equation 1}$$

$$x_u(n) = e^{-j\frac{\pi u n(n+1)}{N_{ZC}}}, \quad 0 \le n \le N_{ZC} - 1,$$

where $N_{RB}^{UL}$ is the number of uplink resource blocks, $n_{PRB}^{RA}$ is the first physical resource block that may be allocated to the PRACH opportunity, and the parameter prach_FrequencyOffset ($n_{PRBoffset}^{RA}$) is the first PRACH available physical resource block that satisfies $0 \le n_{PRBoffset}^{RA} \le N_{RB}^{UL} - 6$ and expressed as a physical resource block number set by higher layers. $f^{RA}$ denotes the frequency resource index within a corresponding time.

For preamble format 4, frequency multiplexing may be performed according to Equation 2 below.

$$n_{PRB}^{RA} = \begin{cases} 6f_{RA}, & \text{if}((n_f \bmod 2) \times (2 - N_{SP}) + t_{RA}^{(1)}) \bmod 2 = 0 \\ N_{RB}^{UL} - 6(f_{RA} + 1), & \text{otherwise} \end{cases} \quad \text{Equation 2}$$

As shown in FIG. 11, the physical layer random access preamble consists of a cyclic prefix of a length TCP and a sequence portion of a length TSEQ. The values of the parameters of the preamble may be determined by a frame structure and a random access configuration. The preamble format is controlled by a higher layer. The values of the parameters according to the preamble formats are shown in Table 1 below.

TABLE 1

| Preamble format | $T_{CP}$ | $T_{SEQ}$ |
|---|---|---|
| 0 | 3168*$T_S$ | 24576*$T_S$ |
| 1 | 21024*$T_S$ | 24576*$T_S$ |
| 2 | 6240*$T_S$ | 2*24576*$T_S$ |
| 3 | 21024*$T_S$ | 2*24576*$T_S$ |
| 4 (Note) | 448*$T_S$ | 4096*$T_S$ |

(Note):
Frame structure type 2 and special subframe with UpPTS length of 4384$T_S$ and 5120$T_S$ When triggered by the MAC layer, transmission of the random access preamble is limited to specific time and frequency resources. These resources are arranged in ascending order of subframe numbers in radio frames and physical resource blocks in the frequency domain such that index 0 corresponds to the physical resource block and subframe assigned the least number in the radio frame. PRACH resources in the radio frame are indicated by a PRACH resource index. For the order of indexing, see 3GPP standard document 36.211.

A random access opportunity for each PRACH configuration is allocated first in the time domain and is allocated in the frequency domain only when the time multiplexing is not performed sufficiently to maintain all the opportunities of the PRACH configuration required for a specific density value D without overlap in the time domain. For preamble formats 0 to 3, frequency multiplexing may be performed according to Equation 1 given below.

Here, $n_f$ denotes a system frame number, and $N_{SP}$ denotes the number of points switching from downlink to uplink in a radio frame. $t_{RA}^{(1)}$ has a value of 0 or 1 to indicate whether the random access resource is positioned in the first half frame or the second half frame.

Each random access preamble occupies a bandwidth corresponding to six consecutive resource blocks in both frame structure types 1 and 2.

The random access preambles may be generated from a Zadoff-Chu sequence having a zero correlation zone. The network configures a set of preamble sequences that the UE is allowed to use.

64 preambles are available for each cell. The set of 64 preamble sequences in a cell may be discovered by including all available first cyclic shifts of the root Zadoff-Chu sequence having the logical index RACH_ROOT_SEQUENCE in ascending order of the cyclic shifts, and RACH_ROOT_SEQUENCE is broadcast as a part of the system information. If 64 preambles cannot be generated from a single root Zadoff-Chu sequence, additional 64 preamble sequences may be acquired from a root sequence with consecutive logical indexes until 64 preamble sequences are all discovered.

The logical root sequence order is cyclic, and thus logical index 0 is continuous to logical index 837. The relationship between the logical root sequence index and the physical root sequence index u may be found in 3GPP standard document 36.211.

The u-th root Zadoff-Chu sequence may be defined by Equation 3 below.

$$x_u(n) = e^{-j\frac{\pi u n(n+1)}{N_{ZC}}}, \quad 0 \le n \le N_{ZC} - 1 \quad \text{Equation 3}$$

The length of the Zadoff-Chu sequence, $N_{ZC}$, may be found in 3GPP standard document 36.211. Random access preambles with zero correlation areas of length $N_{CS}-1$ from the u-th root Zadoff-Chu sequence may be defined by Equation 4 below.

$$x_{u,v} = x_u((n+C_v) \bmod N_{ZC})  \quad \text{Equation 4}$$

Here, the cyclic shift may be defined as Equation 5 below.

$$C_v = \begin{cases} vN_{CS} \text{ (for unrestricted sets)} & v = 0, 1, \ldots, \lfloor N_{ZC}/N_{CS} \rfloor - 1, N_{CS} \neq 0 \\ 0 \text{ (for unrestricted sets)} & N_{CS} = 0 \\ d_{start}\lfloor v/n_{shift}^{RA} \rfloor + (v \bmod n_{shift}^{RA})N_{CS} \text{ (for restricted sets)} & v = 0, 1, \ldots, n_{shift}^{RA} n_{group}^{RA} + \bar{n}_{shift}^{RA} - 1 \end{cases} \quad \text{Equation 5}$$

Here, the value of the NCS may be determined by 3GPP 36.211 and the parameter zeroCorrelationZoneConfig provided by a higher layer. The parameter High-spped-flag from the higher layer determines whether an unrestricted set or a restricted set is to be used.

The variable $d_u$ is a cyclic shift corresponding to a Doppler shift having the size of $1/T_{SEQ}$ and may be defined by Equation 6.

$$d_u = \begin{cases} p & 0 \leq p \leq N_{ZC}/2 \\ N_{ZC} - p & \text{otherwise} \end{cases} \quad \text{Equation 6}$$

Here, p is the least nonnegative integer satisfying (pu) mod $N_{ZC}=1$. The parameters for the restricted sets of cyclic shifts depend on $d_u$ dependent. If $N_{CS} \leq d_u \leq N_{ZC}/3$ is satisfied, the parameters are expressed by Equation 7.

$$n_{shift}^{RA} = \lfloor d_u/N_{CS} \rfloor$$

$$d_{start} = 2d_u + n_{shift}^{RA} N_{CS}$$

$$n_{group}^{RA} = \lfloor N_{ZC}/d_{start} \rfloor$$

$$\bar{n}_{shift}^{RA} = \max(\lfloor N_{ZC} - 2d_u - n_{group}^{RA} d_{start} \rfloor/N_{CS}\rfloor, 0) \quad \text{Equation 7}$$

If $N_{ZC}/3 \leq d_u \leq (N_{ZC}-N_{CS})/2$ is satisfied, the parameters are expressed by Equation 8.

$$n_{shift}^{RA} = \lfloor (N_{ZC}-2d_u)/N_{CS} \rfloor$$

$$d_{start} = N_{ZC} - 2d_u + n_{shift}^{RA} N_{CS}$$

$$n_{group}^{RA} = \lfloor d_u/d_{start} \rfloor$$

$$\bar{n}_{shift}^{RA} = \min(\max(\lfloor d_u - n_{group}^{RA} d_{start} \rfloor/N_{CS}\rfloor, 0), n_{shift}^{RA}) \quad \text{Equation 8}$$

For other values $d_u$, there is no cyclic shift in the restricted set.

Various embodiments related to D2D communication (also called D2D direct communication) will hereinafter be given. Although D2D communication will hereinafter be described based on 3GPP LTE/LTE-A, it should be noted that D2D communication may also be applied to other communication systems (IEEE 802.16, WiMAX etc.)

D2D Communication Type

D2D communication may be classified into Network coordinated D2D communication and Autonomous D2D communication according to whether D2D communication is executed under network control. The network coordinated D2D communication may be classified into a first type (Data only in D2D) in which D2D communication is used to transmit only data and a second type (Connection Control only in Network) in which the network performs only access control according to the degree of network intervention. For convenience of description, the first type will hereinafter be referred to as a Network Centralized D2D communication type, and the second type will hereinafter be referred to as a distributed D2D communication type.

In the Network Centralized D2D communication type, only data is exchanged between D2D UEs, and connection control between D2D UEs and radio resource allocation (grant message) may be carried out by the network. D2D UEs may transmit and receive data and specific control information using radio resources allocated by the network. For example, HARQ ACK/NACK feedback for data reception between D2D UEs, or Channel State Information (CSI) may not be directly exchanged between the D2D UEs, and may be transmitted to another D2D UE over the network. In more detail, if the network configures a D2D link between D2D UEs and allocates radio resources to the configured D2D link, a transmission D2D UE and a reception D2D UE may perform D2D communication using radio resources. In other words, in the network centralized D2D communication type, D2D communication between D2D UEs may be controlled by the network, and D2D UEs may perform D2D communication using radio resources allocated by the network.

The network in the distributed D2D communication type may perform a more limited role than a network in the network centralized D2D communication type. Although the network of the distributed D2D communication type performs access control between D2D UEs, radio resource allocation (grant message) between the D2D UEs may be autonomously occupied by competition of the D2D UEs without the help of the network. For example, HARQ ACK/NACK or CSI in association with data reception between D2D UEs may be directly exchanged between the D2D UEs without passing through the network.

As illustrated in the above example, D2D communication may be classified into network centralized D2D communication and distributed D2D communication according to the degree of D2D communication intervention of the network. In this case, the network centralized D2D communication type and the distributed D2D communication type are characterized in that D2D access control is performed by the network.

In more detail, the network for use in the network coordinated D2D communication type may configure a D2D link between the D2D UEs scheduled to perform D2D communication, such that connection between the D2D UEs may be constructed. When configuring a D2D link between the D2D UEs, the network may assign a physical D2D link identifier (LID) to the configured D2D link. When plural D2D links are present between the D2D UEs, the physical D2D link ID may be used as an ID for identifying each D2D link.

Unlike the network centralized and distributed D2D communication types, the autonomous D2D communication type may allow the D2D UEs to perform D2D communication freely without the help of the network. That is, unlike the network centralized and distributed D2D communication types, the autonomous D2D communication type may control the D2D UE to autonomously perform access control and radio resource occupancy. If necessary, the network may also provide the D2D UE with D2D channel information capable of being used in the corresponding cell.

D2D Communication Link Configuration

For convenience of description, a UE, which is scheduled to perform or may perform D2D communication including D2D direct communication, will hereinafter be referred to as a D2D UE. If a transmitter and a receiver need to be distinguished from each other, a D2D UE, which is scheduled to transmit or may transmit data to another D2D UE using radio resources allocated to the D2D link during D2D communication, will hereinafter be referred to as a transmission (Tx) D2D UE, or another UE, which is scheduled to receive or may receive data from the Tx D2D UE, will hereinafter be referred to as a reception (Rx) D2D UE. If a plurality of D2D UEs, which is scheduled to receive or may receive data from the Tx D2D UE, is used, the Rx D2D UEs may also be identified by ordinal numerals such as "$1^{st}$ to $N^{th}$". For convenience of description, either a base station (BS) for controlling access between the D2D UEs or allocating radio resources to the D2D link or a node (such as a D2D server, and an access/session management server) located at a network stage will hereinafter be referred to as a network.

D2D UE scheduled to perform D2D communication needs to pre-recognize the presence or absence of neighbor D2D UEs capable of transmitting and receiving data so as to transmit data to another D2D UE through D2D communication. For this purpose, the D2D UE may perform D2D peer discovery. The D2D UE may perform D2D discovery within a discovery interval, and all D2D UEs may share the discovery interval. The D2D UE may monitor logical channels of a discovery region within the discovery interval, and may thus receive D2D discovery signals from other D2D UEs. D2D UEs having received a transmission (Tx) signal from another D2D UE may construct the list of neighbor D2D UEs using a reception (Rx) signal. In addition, D2D UE may broadcast its own information (i.e., ID) within the discovery interval, and other D2D UEs may receive the broadcast D2D discovery signal, such that the presence of the corresponding D2D UE in a D2D communication available range may be recognized.

Information for the D2D discovery may be broadcasted periodically. In addition, a timing of such a broadcast may be determined by a protocol in advance and then informed D2D UEs. The D2D UE may transmit/broadcast a signal during a part of the discovery interval and each D2D UE may monitor signals potentially transmitted by other D2D UEs during the rest of the D2D discovery interval.

For instance, the D2D discovery signal may be a beacon signal. In addition, D2D discovery intervals may include a multitude of symbols (e.g., OFDM symbols). The D2D UE may transmit/broadcast the D2D discovery signal in a manner of selecting at least one symbol in the D2D discovery interval. Moreover, the D2D may transmit a signal corresponding to one tone existing in the symbol selected by the D2D UE.

After the D2D UEs discover each other through the D2D discovery process, the D2D UEs may establish a connection establishment process and transmit traffics to other D2D UEs.

Figure 12:
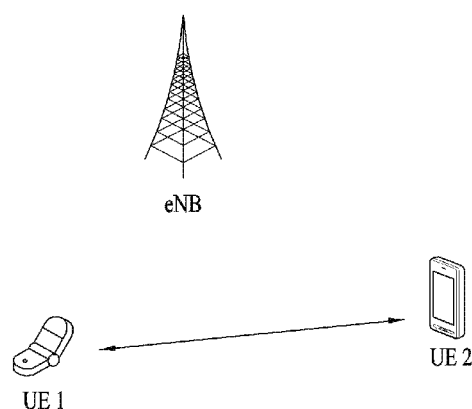
FIG. 12 shows a simplified D2D communication network.

FIG. 12 schematically shows a D2D communication network.

In FIG. 12, D2D communication is performed between UEs (UE1 and UE2) supporting the D2D communication. In general, a UE (user equipment) means a user terminal. However, when a network equipment such as an eNB (evolved Node B) transceives signals according to a communication scheme between UEs (UE1 and UE2), the eNB may also be regarded as a kind of the UE.

The UE1 may be configured to select a resource unit corresponding to specific resources in a resource pool indicating a set of resources and transmit a D2D signal using the corresponding resource unit. The UE2 corresponding to a receiving UE may receive a configuration of the resource pool used by the UE1 to transmit the signal and detect the signal of the UE1 in the corresponding resource pool. For example, when the UE1 is within a coverage of a BS, the BS may inform the resource pool. On the other hand, for example, when the UE1 is out of the coverage of the BS, another UE may inform the UE1 of the resource pool or the UE1 may determine the resource pool based on predetermined resources. Generally, the resource pool may include a plurality of resource units and each UE may select one or a plurality of resource units to transmit its D2D signal.

Figure 13:
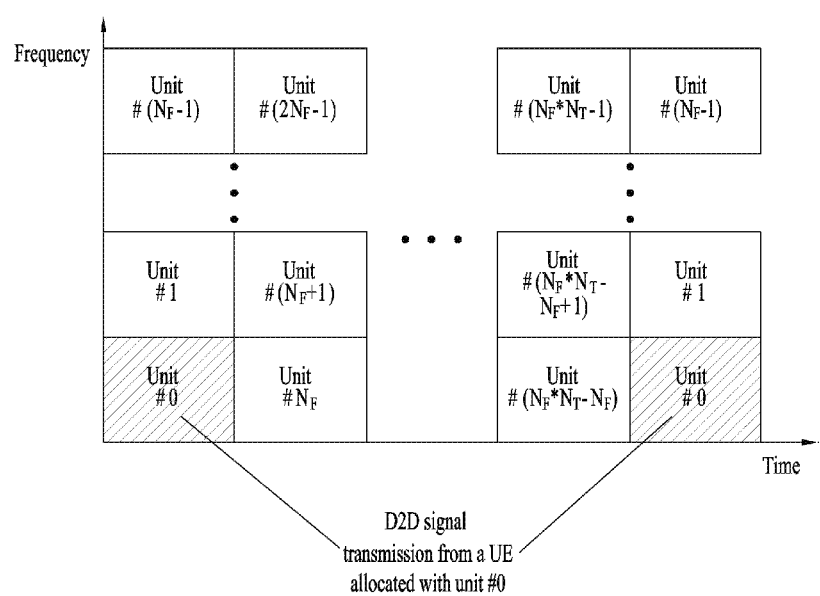
FIG. 13 illustrates configuration of a resource unit according to an example.

FIG. 13 shows an example of a configuration of a resource unit.

In FIG. 13, a vertical axis means frequency resources and a horizontal axis means time resources. In addition, radio resources are divided into NT resources in the time axis, thereby configuring NT subframes. In addition, frequency resources are divided into NF resources in a single subframe, whereby the single subframe may include NT symbols. Thus, a total of (NF*NT) resource units may constitute a resource pool.

In an embodiment of FIG. 13, since a D2D transmission resource allocated to unit #0 is repeated every NT subframes, the resource pool may be repeated with a period of NT subframes. As shown in FIG. 13, a specific resource unit may be repeated periodically. In addition, to obtain a diversity effect in a time dimension or a frequency dimension, an index of a physical resource unit to which a single logical resource unit is mapped may be changed according to a predetermined pattern. For instance, the logical resource unit may be hopped on the time and/or frequency axes according to the pattern predetermined on the actual physical resource unit. In FIG. 13, the resource pool may mean a set of resource units that may be used by a UE intending to transmit a D2D signal to transmit the D2D signal.

The aforementioned resource pool may be subdivided into several types. For instance, the resource pool may be classified according to a content of the D2D signal transmitted in each resource pool. For example, the content of the D2D signal may be classified as follows and a separate resource pool may be configured for each content.

Scheduling assignment (SA): The SA (or SA information) may include a location of resources used by each transmitting UE for transmitting a following D2D data channel, MCS (modulation and coding scheme) necessary for demodulation of other data channels, and/or a MIMO (multiple input multiple output) transmission scheme. In addition, the SA information may include an identifier of a target user equipment to which the transmitting UE intends to transmit data. A signal containing the SA information may be multiplexed and transmitted with D2D data on the same resource unit. In this case, an SA resource pool may mean a resource pool in which the SA is multiplexed and transmitted with the D2D data.

D2D data channel: The D2D data channel may mean a resource pool used by the transmitting UE for transmitting user data by utilizing the resources designated through the SA. In case that the D2D data channel is multiplexed and transmitted with D2D resource data on the same resource unit, only the D2D data channel except the SA information may be transmitted in the resource pool for the D2D data channel. In other words, resource elements for transmitting the SA information on each individual resource unit in the SA resource pool may be used for transmitting the D2D data in the resource pool for the D2D data channel.

Discovery message: A discovery message resource pool may mean a resource pool for transmitting the discovery message. The transmitting UE may transmit the discovery message containing information such as its ID (identifier) for the purpose of enabling neighboring UEs to discover the corresponding transmitting UE.

As described above, the D2D resource pool may be classified according to the content of the D2D signal. However, although D2D signals have the same content, different resource pools may be used according to transmitting and receiving properties of the D2D signals. For instance, even in the case of the same D2D data channel or discovery message, different resource pools may be used according to a scheme for determining a transmission timing of the D2D signal (e.g., the D2D signal is transmitted at a reception time of a synchronization reference signal or at a time obtained by applying a timing advance to the reception time), a scheme for assigning a resource (e.g., an eNB designates a resource for transmitting each individual signal for each individual transmitting UE or each individual transmitting UE autonomously selects the resource for transmitting each individual signal from its resource pool), or a signal format (e.g., the number of symbols occupied by each D2D signal in a single subframe or the number of subframes used for transmitting a single D2D signal).

As mentioned in the foregoing description, a UE that intends to transmit data using the D2D communication may transmit its SA information by selecting appropriate resources from the SA resource pool. In addition, for instance, as reference for selecting the SA resource pool, resources not used by a different UE for SA information transmission and/or SA resources interconnected with resources in a subframe where data transmission is not expected after the SA information transmission by the different UE may be selected as the SA resource pool. Moreover, the UE may select SA resources interconnected with data resources where a low level of interference is expected.

In this regard, the resource allocation method for D2D data channel transmission may be divided into two modes.

Mode 1 may mean a method in which a cell (or network) directly designates resources used for Scheduling Assignment (SA) and D2D data transmission to individual D2D transmitting UEs. In this mode, the cell may recognize a UE which transmits a D2D signal and resources that UE use to transmit a signal. However, since designating a D2D resource for every D2D signal transmission may cause excessive signaling overhead, the cell may allocate a plurality of SA and/or data transmission resources to the UE through one-time signaling.

Mode 2 may mean a method in which a cell (or network) indicates a specific SA and/or D2D data-related resource pool to a plurality of D2D transmitting UEs, and an individual D2D transmitting UE selects an appropriate resource and transmits SA and/or data. In this case, it is difficult for the cell to accurately identify a resource the UE uses for D2D transmission.

Meanwhile, the resource allocation method for discovery (DS) message transmission may be divided into two types.

Type 1 may refer to a DS procedure where a resource for transmitting a DS signal is allocated on a non-UE specific basis.

In addition, Type 2 may refer to a DS procedure where a UE-specific DS signal transmission resource is allocated. Type 2 may include Type 2A in which resources are allocated at the time of transmission of each specific DS signal and Type 2B in which resources for DS signals are semi-persistently allocated.

Figure 14:
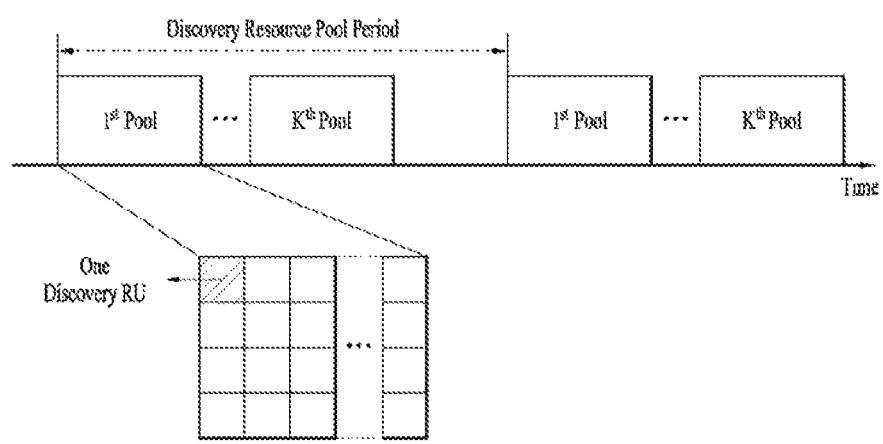
FIG. 14 illustrates a resource pool related to a periodic discovery message according to an example.

FIG. 14 illustrates a resource pool (e.g., discovery resource pool) related to a periodic discovery message according to one example.

In the example of FIG. 14, the period with which the discovery resource pool appears may be referred to as a discovery resource pool period. As shown in FIG. 14, one or more discovery resource pools may exist within the discovery resource pool period. For example, of the discovery resource pools within the discovery resource pool period, particular discovery resource pool(s) may be defined as discovery send/receive resource pool(s) associated with a serving cell, and the other (or remaining) discovery resource pool(s) may be defined as discovery receive resource pool(s) associated with a neighbor cell.

An example of the multiplexing operation/rule between the D2D signal and the Wide Area Network (WAN) signal is given below.

From the perspective of individual UEs, the D2D transmission/reception is assumed not to use full-duplex on a given carrier, and reception of the D2D signal and transmission of the uplink WAN signal shall be performed on a given carrier without full-duplex. In addition, from the perspective of an individual UE, multiplexing of the D2D signal and the WAN signal on a given carrier 1) is not performed by Frequency Division Multiplexing (FDM), 2) may be performed by Time Division Multiplexing (TDM), and 3) may include a collision handling/avoidance mechanism. From the perspective of individual UEs, a UE should prioritize the PRACH in participating in the discovery operation for at least D2D UEs capable of type 1 discovery (if enabled). Further, UEs should not transmit D2D Type 1 discovery signals on resources reserved for PRACH.

In the following description, a method for efficiently transmitting/receiving a D2D signal on a predefined WAN communication-related resource in an environment in which D2D communication is performed is suggested. Hereinafter, for simplicity, rules of D2D signal transmission/reception on a predefined or pre-signaled PRACH (transmission/reception) resource will be described. However, the proposed methods of this specification may also be applied as rules of D2D signal transmission/reception on any WAN communication-related signal (transmission/reception) resource.

Hereinafter, for simplicity, from the perspective of the D2D UE A (which refers to any D2D terminal), if a resource configured for PRACH transmission (e.g., a resource configured for D2D UE A or a plurality of UEs including D2D UE A to transmit the PRACH) is provided for D2D signal transmission, it may be referred to as PRACH&D2D resource #X. Accordingly, PRACH&D2D resource #X may be a resource configured for UE A and other UEs to transmit the PRACH.

Further, in the following embodiments, for example, if PRACH transmission of D2D UE A is scheduled on the PRACH&D2D resource #X, UE A may be configured to transmit the PRACH according to the WAN prioritization rule. In addition, for example, if D2D signal transmission of D2D UE A is scheduled on a resource on which PRACH transmission of the D2D UE A is not scheduled but PRACH transmission of other UEs is possible, the following embodiments may be applied. The following embodiments may be applied only when D2D UE A does not perform PRACH transmission on PRACH&D2D resource #X.

In the following description, the D2D Synchronization Signal (D2DSS) may refer to the Primary D2DSS (PD2DSS) and/or the Secondary D2DSS (SD2DSS).

Embodiment 1

A rule may be defined such that transmission of the D2D signal on PRACH&D2D resource #X is exceptionally allowed. For example, D2D transmission on PRACH&D2D resource #X may be allowed based on predefined or pre-signaled triggering or scheduling of the eNB.

For example, the eNB allows transmission of the D2D signal of D2D UE A on PRACH&D2D resource #X (by (triggering or scheduling), which may mean that the eNB disallows other UEs communicating therewith (for example, Radio Resource Control (RRC)-connected UEs) to (intentionally) perform RACH transmission on PRACH&D2D resource #X. Therefore, mutual interference which may occur if transmission/reception of the D2D signal and transmission/reception of the PRACH signal are performed (by different UEs) on the same PRACH&D2D resource #X may be avoided.

D2D signal transmission based on the triggering or scheduling of the eNB described above may be defined as, for example, transmission of a D2D signal based on, for example, Scheduling Assignment (SA) channel transmission and/or Mode 1 D2D communication data channel transmission related to Mode 1 D2D communication described above, and/or transmission of a discovery signal of a Type 2 discovery procedure (which may be limited to, for example, the Type 2A discovery procedure or Type 2B discovery procedure), and/or transmission of a D2DSS of a D2D UE configured as a synchronization source by the eNB among in-coverage D2D UEs.

In the above example, transmission of the D2DSS (based on eNB triggering/scheduling) may be performed to maintain or establish time/frequency synchronization between D2D UEs participating in D2D communication. Accordingly, if transmission of the D2DSS is missed or omitted, D2D communication performance may be greatly affected. Therefore, as described above, transmission of the D2DSS (based on eNB triggering/scheduling) on PRACH&D2D resource #X may be exceptionally allowed.

Further, if D2D UE A transmits neither the PRACH nor the eNB triggering (scheduling)-based D2D signal on PRACH&D2D resource #X configured for D2D UE A, this may be interpreted as meaning that D2D UE A expects to receive a D2D signal from another D2D UE on PRACH&D2D resource #X. In this case, D2D UE A may perform, for example, blind detection (BD) on a D2D signal that is likely to be transmitted from another specific D2D UE on PRACH&D2D resource #X.

Embodiment 2

A rule may be defined such that transmission of a D2D signal (or a D2D channel) that is predefined or pre-indicated by signaling is exceptionally allowed on PRACH&D2D resource #X. For example, the D2D signal (or D2D channel) that is exceptionally allowed to be transmitted on PRACH&D2D resource #X may be limited to a specific D2D signal. For example, transmission of an SA channel (e.g., the Mode 1 or Mode 2 D2D communication-related SA channel), and/or a data channel (e.g., the Mode 1 or Mode 2 D2D communication related data channel), and/or a D2DSS (transmitted from, for example, an in-coverage or out-of-coverage synchronization source), and/or a Physical D2D Synchronization Channel (PD2DSCH) may be exceptionally allowed on PRACH&D2D resource #X.

Also, in the above-described examples, if D2D UE A to which PRACH&D2D resource #X is signaled or configured does not transmit either the PRACH or the D2D signal whose transmission is exceptionally allowed, this may be interpreted as meaning that the D2D UE expects to receive a D2D signal from another D2D UE on PRACH&D2D resource #X. In this case, D2D UE A may perform, for example, blind detection (BD) on a D2D signal that is likely to be transmitted from another specific D2D UE on PRACH&D2D resource #X.

Embodiment 3

A rule may be defined such that transmission of the D2D signal (or D2D channel) on PRACH&D2D resource #X is exceptionally allowed if at least some or all of the conditions described below are satisfied on PRACH&D2D resource #X. The conditions for exceptional transmission of a D2D signal, which will be described later, may be applied together with Embodiments 1 and/or 2 described above, or may be applied independently of Embodiments 1 and 2.

As a condition for exceptional transmission of a D2D signal (or D2D channel), a signal to be transmitted in accordance with the downlink timing (or uplink timing) (of the D2D UE) may be defined among the D2D signals. For example, a D2D signal transmitted according to the downlink timing may be defined as an SA channel (and/or a Mode 2 D2D communication-related data channel and/or a Type 1 discovery message). A D2D signal transmitted according to the uplink timing may be defined as a Mode 1 D2D communication-related data channel (and/or a Type 2 discovery channel).

As a condition for exceptional transmission of a D2D signal (or D2D channel), a D2D signal transmitted from an in-coverage (or out-of-coverage) D2D UE may be defined.

As a condition for exceptional transmission of a D2D signal (or D2D channel), a D2DSS transmitted based on a sequence in the D2DSS_UE_NET set or a D2DSS transmitted based on a sequence in the D2DSS_UE_CON set may be defined. For example, D2DSS_UE_NET may refer to "a set of D2DSS sequence(s) transmitted by UE when the eNB transmission timing is an eNB." D2DSS_UE_CON may refer to a set of D2DSS sequence(s) transmitted by UE when the transmission timing is not an eNB."

As a condition for exceptional transmission of a D2D signal (or D2D channel), a D2D signal transmitted at a transmit power that is less than or greater than a predefined or signaled threshold may be defined. For example, the threshold may be defined as a (virtual) PRACH transmission power calculated on the assumption of transmission of the PRACH on PRACH&D2D resource #X.

Embodiment 4

The above-described embodiments (Embodiment 1, Embodiment 2 and/or Embodiment 3) may be used only on a predefined (or signaled) resource pool (of time and/or frequency resources) (in which an exceptional operation is allowed). For example, exceptional transmission of a D2D signal may be allowed only in a predefined or pre-signaled resource pool, which may transmission of an exceptional D2D according to Embodiment 1, Embodiment 2 and/or Embodiment 3.

For example, a resource condition for transmission of an exceptional signal and exceptional permission of transmission of a Mode 1 D2D communication-related SA channel of Embodiment 1 may be applied together. In this case, exceptional transmission of the actual SA channel may be allowed only on a predefined or pre-signaled (exceptional operation-allowed) SA channel resource pool. Exceptional transmission of the actual SA channel may not be allowed in an SA channel resource pool that is not predefined or pre-signaled.

The information on the resource pool in which the exceptional operation is allowed may be transmitted to the D2D UE through a predefined signal (e.g., System Information Block (SIB), RRC, PD2DSCH) or may be preconfigured for the D2D UE.

Furthermore, a rule may be defined such that Embodiment 1, Embodiment 2 and/or Embodiment 3 described above are applied only in D2D communication-related scenarios that are predefined or pre-signaled. For example, the D2D communication-related scenarios may include an in-coverage scenario, an out-of-coverage scenario, or a partial-coverage scenario.

The above-described embodiments may be implemented independently or in combination. A rule may be defined such that the above-described embodiments are applied only in a Frequency Division Duplex (FDD) or Time Division Duplex (TDD) system environment.

Figure 15:
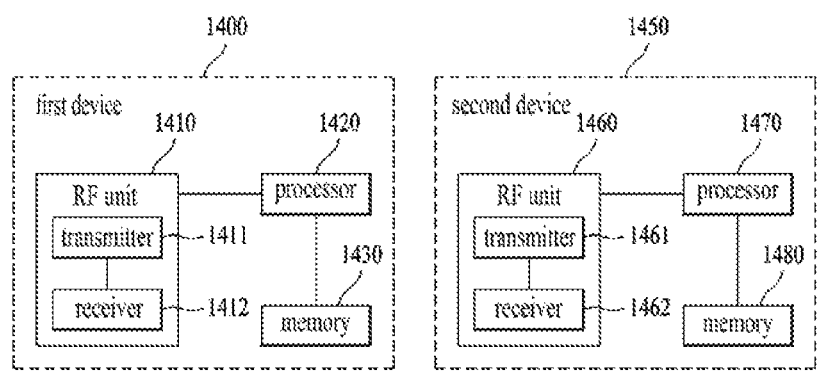
FIG. 15 is a schematic diagram illustrating devices according to an embodiment of the present invention.

FIG. 15 is a schematic diagram illustrating configuration of devices to which the embodiments of the present invention illustrated in FIGS. 1 to 14 may be applied according to an embodiment of the present invention.

In FIG. 15, each of a first device 1400 and a second device 1450, which are D2D UEs, includes a radio frequency (RF) unit 1410, 1460, a processor 1420, 1470, and, optionally, a memory 1430, 1480. Although FIG. 15 shows configuration of two D2D UEs, a plurality of D2D UEs may establish a D2D communication environment.

Each of the RF unit 1430 and 1460 may include a transmitter 1411, 1461 and a receiver 1412, 1462. The transmitter 1411 and the receiver 1412 of the first device 1400 may be configured to transmit and receive signals to and from the second device 1450 and other D2D UEs, and the processor 1420 may be functionally connected to the transmitter 1411 and the receiver 1412 to control the transmitter 1411 and the receiver 1412 to transmit and receive signals to and from other devices. Meanwhile, the first device 1400 and/or the second device 1450 may be an eNB.

The processor 1420 may perform various kinds of processing on a signal to be transmitted, and then transmit the signal to the transmitter 1411, and process a signal received by the receiver 1412. If necessary, the processor 1420 may store, in the memory 1430, information contained in an exchanged message.

With the above-described structure, the first device 1400 may perform the methods of the various embodiments of the present invention described above. For example, each signal and/or message may be transmitted and received using a transmitter and/or receiver of the RF unit, and each operation may be performed under control of the processor.

Although not shown in FIG. 15, the first device 1400 may include various additional elements according to device application type. For example, if the first device 1400 is for intelligent metering, the first device 1400 may include an additional element for power measurement and the like. The operation of power measurement may be performed under control of the processor 1420 or a separately configured processor (not shown).

For example, the second device 1450 may be an eNB. In this case, the transmitter 1461 and receiver 1462 of the eNB may be configured to transmit and receive signals to and from other eNBs, D2D servers, D2D devices, and the processor 1470 may be functionally connected to the transmitter 1461 and the receiver 1462 and may be configured to control the process of the transmitter 1461 and the receiver 1462 transmitting and receiving signals to and from other devices. In addition, the processor 1470 may perform various kinds of processing on a signal to be transmitted, transmit the signal to the transmitter 1461, and process a signal received by the receiver 1462. If necessary, the processor 1470 may store, in the memory 1430, information contained in an exchanged message. With the above-described structure, the eNB 1450 may perform the methods of the various embodiments described above.

In FIG. 15, the processors 1420 and 1470 of the first device 1410 and the second device 1450 respectively instruct operations for the first device 1410 and the second device 1450 (for example, control, adjustment, management, etc.). Each of the processors 1420 and 1470 may be connected to the memory 1430, 1480 that stores program code and data. The memories 1430 and 1480 may be connected to the processors 1420 and 1470 to store operating systems, applications, and general files.

The processors 1420 and 1470 of the present invention may be referred to as a controller, a microcontroller, a microprocessor, a microcomputer, or the like. Meanwhile, the processors 1420 and 1470 may be implemented by hardware, firmware, software, or a combination thereof. When embodiments of the present invention are implemented using hardware, the processors 1420 and 1470 may include application specific integrated circuits (ASICs), digital signal processors (DSPs), digital signal processing devices (DSPDs), programmable logic devices (PLDs), or field programmable gate arrays (FPGAs).

When embodiments of the present invention are implemented using firmware or software, the firmware or software may be configured to include modules, procedures, or functions that perform the functions or operations of the present invention. The firmware or software configured to implement the present invention may be provided within the processors 1420 and 1470 or may be stored in the memories 1430 and 1480 and driven by the processors 1420 and 1470.

The embodiments described above are constructed by combining elements and features of the present invention in a predetermined form. Each element or feature should be understood as optional unless explicitly mentioned otherwise. Each of the elements or features can be implemented without being combined with other elements. In addition, some elements and/or features may be combined to configure an embodiment of the present invention. The sequence of operations discussed in the embodiments of the present invention may be changed. Some elements or features of one embodiment may also be included in another embodiment, or may be replaced by corresponding elements or features of another embodiment. Claims that are not explicitly cited in each other in the appended claims may be combined to establish an embodiment of the present invention or be included in a new claim by subsequent amendment after the application is filed.

The present invention may be embodied in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

The embodiments of the present invention as described above may be applied to various mobile communication systems.

The invention claimed is:

1. A method for transmitting a Device-to-Device (D2D) signal by a user equipment (UE) in a D2D communication, the method comprising:
   receiving, from a base station, Physical Random Access Channel (PRACH) resource information indicating a PRACH resource available for transmission of a PRACH;
   receiving, from the base station, D2D resource information indicating a D2D resource available for transmission and reception of the D2D signal;
   transmitting, when the UE is configured to transmit the PRACH on a first radio resource indicated as the PRACH resource and the D2D resource, the PRACH on the first radio resource; and
   transmitting, when the UE is not configured to transmit the PRACH on the first radio resource and the D2D signal is a specific type of D2D signal that is allowed to be transmitted on the first radio resource, the D2D signal on the first radio resource,
   wherein the specific type of D2D signal is a D2D Scheduling Assignment (SA) signal, a D2D data signal, a Physical D2D Synchronization Channel (PD2DSCH), or a D2D Synchronization Signal (D2DSS).

2. The method according to claim 1, wherein the transmitting of the D2D signal on the first radio resource is performed when the UE is configured to transmit the D2D signal by the base station.

3. The method according to claim 1, wherein the transmitting of the D2D signal on the first radio resource is performed when the D2D signal is a Type 2b D2D discovery signal.

4. The method according to claim 1, wherein a transmit power for the transmitting of the D2D signal is less than or equal to a preset threshold.

5. The method of claim 4, wherein the preset threshold is a transmit power of the PRACH calculated on an assumption that the PRACH is transmitted on the first radio resource.

6. The method according to claim 1, wherein the PRACH resource information is commonly configured for a plurality of UEs including the UE.

7. The method according to claim 1, wherein the transmitting of the D2D signal is performed when the first radio resource is preconfigured such that the transmitting of the D2D signal is enabled on the PRACH resource.

8. The method of claim 7, wherein the first radio resource is configured to enable the transmitting of the D2D signal based on preconfigured signaling,
   wherein the preconfigured signaling comprises at least one of a System Information Block (SIB), a Radio Resource Control (RRC) or a Physical D2D Synchronization Channel (PD2DSCH) from the base station.

9. A method for receiving a Device-to-Device (D2D) signal by a user equipment (UE) in a D2D communication, the method comprising:
   receiving, from a base station, Physical Random Access Channel (PRACH) resource information indicating a PRACH resource available for transmission of a PRACH;
   receiving, from the base station, D2D resource information indicating a D2D resource available for transmission and reception of the D2D signal;
   transmitting, when the UE is configured to transmit the PRACH on a first radio resource indicated as the PRACH resource and the D2D resource, the PRACH on the first radio resource; and
   receiving, when the UE is not configured to transmit the PRACH on the first radio resource and the D2D signal is a specific type of D2D signal that is allowed to be transmitted on the first radio resource, the D2D signal from another UE on the first radio resource,
   wherein the specific type of D2D signal is a D2D Scheduling Assignment (SA) signal, a D2D data signal, a Physical D2D Synchronization Channel (PD2DSCH), or a D2D Synchronization Signal (D2DSS).

10. The method of claim 9, wherein the receiving of the D2D signal comprises:
    performing blind detection on the first radio resource.

11. A user equipment (UE) for transmitting a Device-to-Device (D2D) signal in a D2D communication, the UE comprising:
    a radio frequency unit configured to transmit and receive signals; and
    a processor configured to control the radio frequency unit, wherein the processor is configured to:
    receive, from a base station, Physical Random Access Channel (PRACH) resource information indicating a PRACH resource available for transmission of a PRACH;
    receive, from the base station, D2D resource information indicating a D2D resource available for transmission and reception of the D2D signal;
    transmit, when the UE is configured to transmit the PRACH on a first radio resource indicated as the PRACH resource and the D2D resource, the PRACH on the first radio resource; and
    transmit, when the UE is not configured to transmit the PRACH on the first radio resource and the D2D signal is a specific type of D2D signal that is allowed to be transmitted on the first radio resource, the D2D signal on the first radio resource,
    wherein the specific type of D2D signal is a D2D Scheduling Assignment (SA) signal, a D2D data signal, a Physical D2D Synchronization Channel (PD2DSCH), or a D2D Synchronization Signal (D2DSS).

12. A user equipment (UE) for receiving a Device-to-Device (D2D) signal in a D2D communication, the UE comprising:
    a radio frequency unit configured to transmit and receive signals; and
    a processor configured to control the radio frequency unit, wherein the processor is configured to:
    receive, from a base station, Physical Random Access Channel (PRACH) resource information indicating a PRACH resource available for transmission of a PRACH;
    receive, from the base station, D2D resource information indicating a D2D resource available for transmission and reception of the D2D signal;
    transmit, when the UE is configured to transmit the PRACH on a first radio resource indicated as the PRACH resource and the D2D resource, the PRACH on the first radio resource; and receive, when the UE is not configured to transmit the PRACH on the first radio resource and the D2D signal is a specific type of D2D signal that is allowed to be transmitted on the first radio resource, the D2D signal from another UE on the first radio resource, wherein the specific type of D2D signal is a D2D Scheduling Assignment (SA) signal, a D2D data signal, a Physical D2D Synchronization Channel (PD2DSCH), or a D2D Synchronization Signal (D2DSS).

* * * * *